(No Model.)

W. SMART.
BALL JOINT FOR CHANDELIERS.

No. 393,126.            Patented Nov. 20, 1888.

WITNESSES:      *Fig. 4.*      INVENTOR:
J. D. Garfield            W. Smart.
C. Sedgwick               BY Munn & Co.

ATTORNEYS.

N. PETERS, Photo-Lithographer, Washington, D. C.

UNITED STATES PATENT OFFICE.

WALTER SMART, OF JERSEY CITY, NEW JERSEY.

BALL-JOINT FOR CHANDELIERS.

SPECIFICATION forming part of Letters Patent No. 393,126, dated November 20, 1888.

Application filed March 16, 1888. Serial No. 267,386. (No model.)

*To all whom it may concern:*

Be it known that I, WALTER SMART, of Jersey City, in the county of Hudson and State of New Jersey, have invented a new and useful Improvement in Ball-Joints for Chandeliers, of which the following is a full, clear, and exact description.

This invention relates to an improvement in ball-joints for hanging chandeliers in which a coupling-sleeve adapted to be screwed on a permanent gas or fluid pipe projecting from a ceiling or kindred support is provided with an internal socket to receive a ball having a depending shank for connection to the main pipe of a chandelier.

The object of my improvement is to secure greater strength, simplicity, durability, and efficiency than has heretofore generally been attained; and to this end the invention consists of a novel construction and combination of parts, substantially as hereinafter described and as distinctly claimed.

Reference is to be had to the accompanying drawings, forming a part of this specification, in which similar letters of reference indicate corresponding parts in all the figures.

Figure 1:
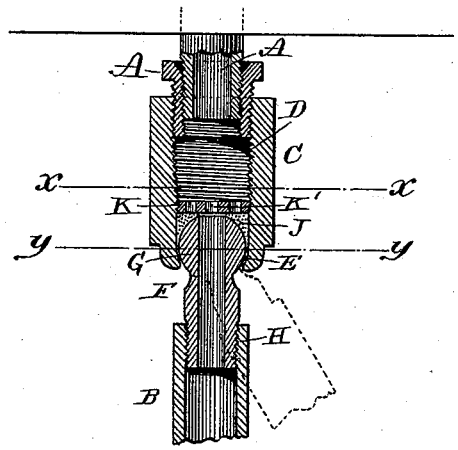
Figure 2:
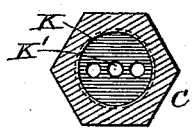
Figure 3:
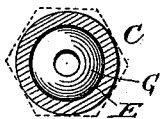
Figure 3:

Figure 1 is a central sectional elevation of a ball-joint for a chandelier embodying my improvement. Fig. 2 is a sectional plan view of the same on the line $x\,x$, Fig. 1. Fig. 3 is a sectional plan view on the line $y\,y$, Fig. 1; and Fig. 4 is a sectional view of the packing-ring.

A designates the externally-threaded end of a gas-pipe projecting from an overhead support, and B the upper internally-threaded end of a chandelier main pipe.

The coupling for jointing the pipe B universally to the fixed pipe A is formed mainly of a sleeve, C, having in its upper end an internal thread, D, to screw on the pipe A, or a reducing-sleeve, A', as may be necessary, and in its lower end an internal spherical socket, E, and a tubular shank, F, having a ball, G, on its upper end, which is fitted to and seated in the socket E, and an external thread, H, on its lower end to screw into the chandelier-pipe B.

The sleeve C is formed, with its socket E, from a single piece of metal, which is drilled and screw-tapped from its upper end to within a short distance of its lower end and round-reamed thereat to form the socket E. The shank F is likewise formed with the ball G from a single bar of metal, which is drilled through its entire length to form the tubular bore and turned and threaded exteriorly, as required.

The sleeve C is made from its upper end to its socket of a larger diameter than the ball G, to permit the same to be introduced from the said upper end, and the internal thread, D, is extended to or nearly to the socket.

On the top of the ball G, when seated, is placed a packing-ring, J, of cork or kindred slightly-compressible material, having a concave bottom to fit the spherical top of the ball G, and an externally-threaded disk, K, having a central aperture, K', to register continually with the tubular bore of the ball and shank, and side holes to receive a tool for turning it, is screwed into the sleeve upon the packing-ring J, so as to compress the same and hold the ball securely to its seat, while permitting its free movement thereon. The passage of the gas or other fluid from the pipe A to the chandelier is thus wholly uninterrupted and the chandelier strongly and neatly supported, while permitted to swing freely in any direction until arrested by some lateral influence.

Having thus described my invention, what I claim as new, and desire to secure by Letters Patent, is—

The herein-described ball-joint for chandeliers, consisting of the sleeve C, having its upper part internally screw-threaded and its lower part provided with an internal spherical socket, E, the tubular shank F, having a ball on its lower externally-threaded end, and provided with the ball G on its upper end, fitting the socket of the said sleeve, the yielding packing-ring J, having a concave bottom, and the externally-threaded disk provided with the central aperture, K', and screwed into the sleeve onto the said packing, substantially as specified.

WALTER SMART.

Witnesses:
JAMES F. FIELDER,
RYNIER J. WORTENDYKE.